Patented Nov. 25, 1930

1,782,830

UNITED STATES PATENT OFFICE

JAMES B. PIERCE, JR., OF CHARLESTON, WEST VIRGINIA, ASSIGNOR TO BARIUM REDUCTION CORPORATION, OF CHARLESTON, WEST VIRGINIA, A CORPORATION OF DELAWARE

MANUFACTURE OF STRONTIUM OXIDE

No Drawing. Application filed January 29, 1927. Serial No. 164,658.

This invention relates to the manufacture of strontium oxide and has for its object the provision of an improved method of making strontium oxide, and more particularly strontium oxide of an easily oxidizable structure or nature.

In my United States Patent No. 1,325,043 dated December 16, 1919, I have described a method of making strontium peroxide ($SrO_2$) by bringing strontium oxide ($SrO$) into direct union with oxygen under pressure in the presence of heat. In the manufacture of strontium peroxide according to the process of that patent, I have discovered that the method of preparing or manufacturing the strontium oxide has a great deal to do with how readily it is oxidized into the peroxide. Thus, I have found that strontium oxide made by calcining strontium nitrate cannot (even if the pressure of oxygen be increased to 2,000 pounds or more per square inch) be oxidized to a high test peroxide; not over 25 to 30% of strontium peroxide be obtainable, no matter how many times the oxidation be repeated. I have furthermore found that when strontium carbonate is converted by calcination at a temperature above 1200° C. to strontium oxide, the oxide so obtained may be oxidized, by the process of my aforementioned patent, to strontium peroxide of high test, over 85% $SrO_2$, but only after repeated oxidations say three or four.

My present invention is more particularly directed to the preparation of an easily oxidizable strontium oxide especially adapted to be used in the preparation of strontium peroxide by the process of my aforesaid patent. I have discovered that an easily oxidizable strontium oxide can be prepared from amorphous strontium carbonate which has been made by the precipitation of the strontium as carbonate from an alkaline strontium compound by carbon dioxide or sodium carbonate. My invention is based on this discovery and involves an improved method of making strontium oxide as well as a new form of strontium oxide of an easily oxidizable structure or nature.

In accordance with the invention, I first prepare the amorphous strontium carbonate by treating an aqueous solution of an alkaline strontium compound, preferably the hydrate or an alkali-metal sulfide, with carbon dioxide gas, sodium carbonate, or equivalent carbonic acid derivative. The resulting precipitate of strontium carbonate is separated from the reaction mixture and dried to any desired degree. The strontium carbonate so prepared is now mixed with an equimolecular amount of ashless carbon black equivalent to 8.13% by weight, and the mixture is calcined at a temperature of approximately 1200° C. in a closed muffle. The strontium oxide resulting from this calcination operation is flaky, soft, very permeable and reacts readily with oxygen when subjected to the oxidation process of my aforementioned patent.

I have found that strontium oxide prepared in accordance with the present invention can be oxidized to strontium peroxide by the process of my aforementioned patent with lower oxygen pressures and fewer repetitions of the oxidizing treatment than any other form of strontium oxide known to me. Oxidation of the strontium oxide of the invention, in the process of my aforementioned patent, will commence at an oxygen pressure as low as 400 pounds per square inch and is complete at 1300 pounds per square inch oxygen pressure, the reaction being carried on at a temperature of 400 to 500° C. A high test strontium peroxide product, over 85% $SrO_2$, is often obtained in a single oxidation and always on a second oxidation.

I claim:—

1. The method of manufacturing strontium oxide which comprises preparing strontium carbonate by treating an aqueous solution of an alkaline strontium compound with a carbonic acid derivative, and subjecting a mixture of the resulting strontium carbonate with ashless carbon black in about equimolecular proportions to calcination in a closed muffle at a temperature of about 1200° C.

2. The method of manufacturing strontium oxide which comprises precipitating strontium carbonate from an alkaline strontium compound with carbon dioxide or sodium carbonate, mixing the resulting strontium carbonate with 8.13% by weight of ashless carbon black, and subjecting the mixture to calcination in a closed muffle at a temperature of about 1200° C.

3. Strontium oxide in the form of flakes.

4. Strontium oxide in the form of soft, permeable flakes.

In testimony whereof I affix my signature.

JAMES B. PIERCE, Jr.